B. BACCHI.
LEG GUARD FOR MOTOR CYCLES.
APPLICATION FILED NOV. 24, 1920.
1,431,866.
Patented Oct. 10, 1922.
2 SHEETS—SHEET 1.
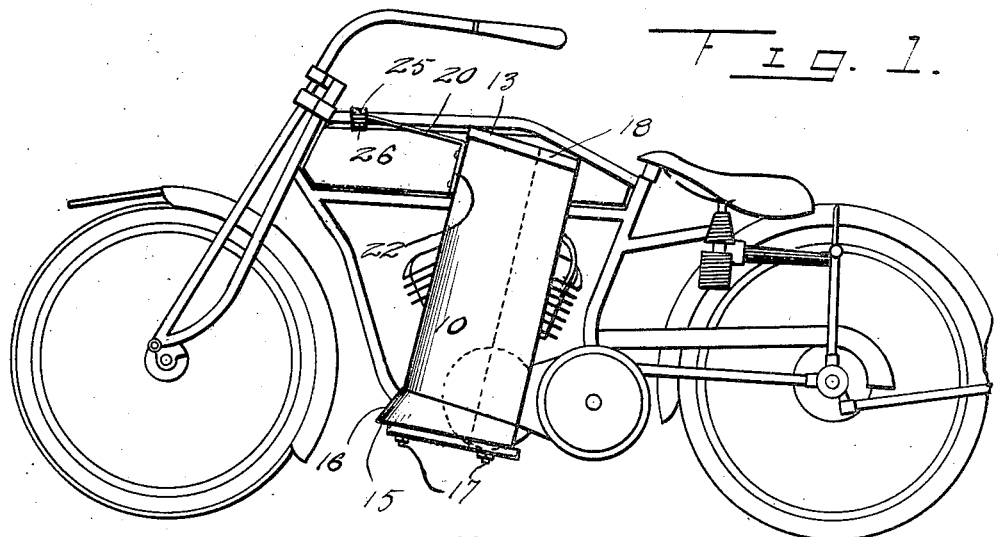
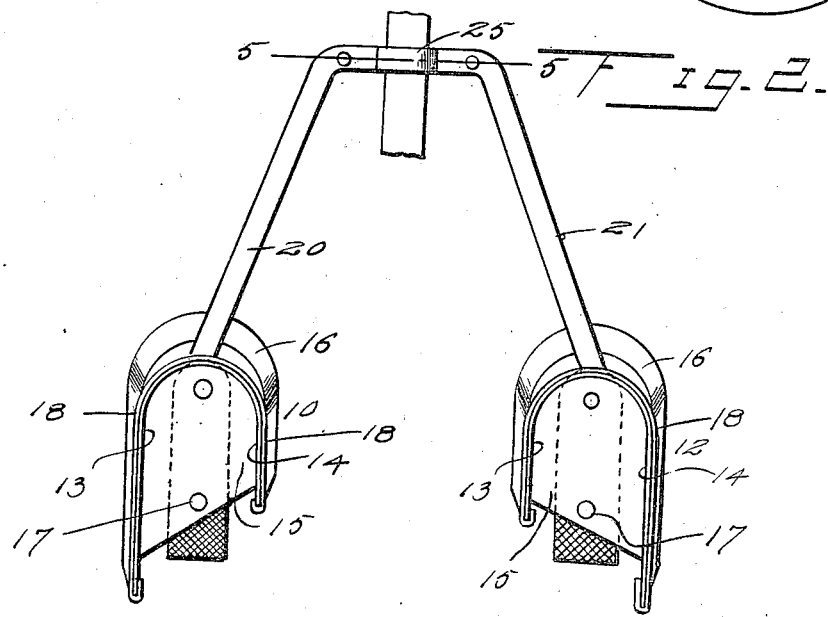
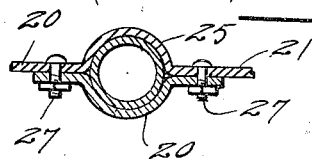
Inventor
B. Bacchi

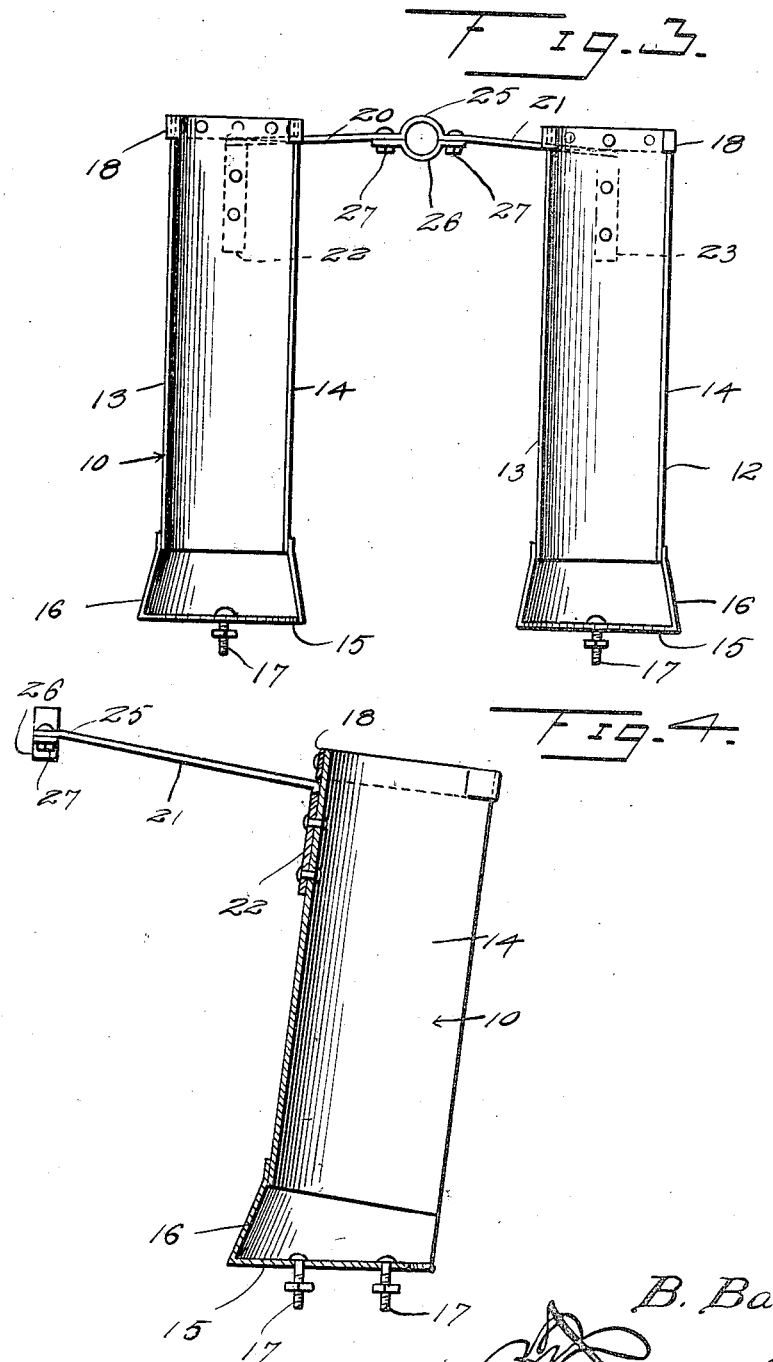

Patented Oct. 10, 1922.

1,431,866

UNITED STATES PATENT OFFICE.

BERICO BACCHI, OF ORANGE, NEW JERSEY.

LEG GUARD FOR MOTOR CYCLES.

Application filed November 24, 1920. Serial No. 426,243.

*To all whom it may concern:*

Be it known that I, BERICO BACCHI, a subject of the King of Italy, residing at Orange, in the county of Essex and State of New Jersey, have invented certain new and useful Improvements in a Leg Guard for Motor Cycles; and I do hereby declare the following to be a full, clear, and exact description of the invention, such as will enable others skilled in the art to which it appertains to make and use the same.

This invention relates to a leg guard for a motorcycle, and the object is to provide means for protecting the limbs of the rider from the effect of cold air and from mud.

A further object is to provide a device of the type indicated which shall include a plurality of channel shaped elements, with means for properly securing these devices in position, for accomplishing the purpose indicated, and also for protecting the operative elements of the machine from the air current.

A still further object is to provide, in connection with a frame or yoke, and means for securing the yoke in position,—a plurality of channel elements each having one open end and one closed end, the channel elements being formed preferably of sheet metal.

With the foregoing and other objects in view, the invention consists in the novel construction, combination, and arrangement of elements hereinafter described and claimed, it being understood that modifications or variations in construction may be made within the scope of the claims, without departing from the spirit of the invention.

In the accompanying drawing:—

Figure 1 is a side elevation illustrating leg guards attached to a motorcycle and constructed in accordance with my invention, Figure 2 is a top plan view illustrating the device, Figure 3 is a rear elevation illustrating the same, Figure 4 is a vertical sectional view illustrating one of the guards, and Figure 5 is a detail sectional view illustrating the means of attaching the guards to one of the rails of the frame of the motorcycle.

In carrying out my invention, I provide a plurality of channel elements 10 and 12, each including the side walls 13 and 14, and one closed end wall 15, an outwardly flared portion 16 being formed adjacent to the closed end. Passing through these end elements are the securing devices 17 for securing said elements to the ordinary foot rests of a motorcycle.

The open ends of the channel elements may be reinforced by strips or bands 18, secured to the walls of each channel element by means of rivets.

A U-shaped frame includes the side members 20 and 21 and the offset portions 22 and 23, the latter being secured respectively to the channel elements by means of rivets, or otherwise. The central portion of the U-member is designated 25, being curved as shown, and cooperating with said curved portion is a strap 26 secured by screws or bolts 27, permitting of the mounting of the frame and of the channel elements in the manner illustrated.

As previously intimated, this device is not only useful as a mud guard and as a protection from cold in severe weather, but also serves in a measure to protect the operative elements of the machine, and especially the motor.

Having thus described the invention, what I claim is:—

1. A device of the character set forth comprising a pair of transversely curved guard elements having their lower ends flared, bottom walls closing said ends of the elements and resting on and secured to the foot rests of a motorcycle, a substantially U-shaped member having its free ends secured to the upper ends of said elements and having its central portion offset to receive the frame of the motorcycle, and means to secure the frame of the motorcycle to the offset.

2. A device of the character set forth comprising a pair of guard elements each having front and side walls and having their lower ends flared, bottom walls closing said ends of the elements and resting on and secured to the foot rests of a motorcycle, a substantially U-shaped member having its free ends secured to the upper ends of said elements and having its central portion offset to receive the frame of the motorcycle, and means to secure the frame of the motorcycle to the offset.

In testimony whereof I affix my signature in presence of two witnesses.

BERICO BACCHI.

Witnesses:
 BANDO BOKEY,
 FRED JURGENS.